US008645298B2

(12) United States Patent (10) Patent No.: US 8,645,298 B2
Hennig et al. (45) Date of Patent: Feb. 4, 2014

(54) TOPIC MODELS

(75) Inventors: Philipp Hennig, Cambridge (GB); David Stern, Cambridge (GB); Thore Graepel, Cambridge (GB); Ralf Herbrich, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 527 days.

(21) Appl. No.: 12/912,428

(22) Filed: Oct. 26, 2010

(65) Prior Publication Data

US 2012/0101965 A1 Apr. 26, 2012

(51) Int. Cl.
*G06F 17/00* (2006.01)
*G06F 15/18* (2006.01)
*G06N 5/00* (2006.01)
*G06F 7/00* (2006.01)
*G06F 17/30* (2006.01)

(52) U.S. Cl.
USPC ............... 706/45; 706/12; 707/708; 707/727; 707/731; 707/738; 707/810

(58) Field of Classification Search
USPC .............. 706/12, 45; 707/708, 727, 731, 738, 707/810
See application file for complete search history.

(56) References Cited

U.S. PATENT DOCUMENTS

| 6,928,425 | B2 | 8/2005 | Grefenstette |
| 6,941,321 | B2 | 9/2005 | Schuetze |
| 7,231,388 | B2 | 6/2007 | Matsubayashi |
| 7,747,593 | B2 | 6/2010 | Patterson |
| 2001/0037324 | A1 | 11/2001 | Agrawal |
| 2006/0089924 | A1 | 4/2006 | Raskutti |
| 2009/0307213 | A1 | 12/2009 | Deng |

OTHER PUBLICATIONS

Rosen-Zvi, Michal, et al. "The author-topic model for authors and documents." Proceedings of the 20th conference on Uncertainty in artificial intelligence. AUAI Press, 2004.*
Hsu, Bo-June Paul, and James Glass. "Style & topic language model adaptation using HMM-LDA." Proceedings of the 2006 Conference on Empirical Methods in Natural Language Processing. Association for Computational Linguistics, 2006.*
Wei, Xing, and W. Bruce Croft. "LDA-based document models for ad-hoc retrieval." Proceedings of the 29th annual international ACM SIGIR conference on Research and development in information retrieval. ACM, 2006.*
Yao, Limin, David Mimno, and Andrew McCallum. "Efficient methods for topic model inference on streaming document collections." Proceedings of the 15th ACM SIGKDD international conference on Knowledge discovery and data mining. ACM, 2009.*

(Continued)

*Primary Examiner* — Jeffrey A Gaffin
*Assistant Examiner* — James F Sugent
(74) *Attorney, Agent, or Firm* — Microsoft Corporation

(57) ABSTRACT

Machine learning techniques may be used to train computing devices to understand a variety of documents (e.g., text files, web pages, articles, spreadsheets, etc.). Machine learning techniques may be used to address the issue that computing devices may lack the human intellect used to understand such documents, such as their semantic meaning. Accordingly, a topic model may be trained by sequentially processing documents and/or their features (e.g., document author, geographical location of author, creation date, social network information of author, and/or document metadata). Additionally, as provided herein, the topic model may be used to predict probabilities that words, features, documents, and/or document corpora, for example, are indicative of particular topics.

20 Claims, 11 Drawing Sheets

(56) References Cited

OTHER PUBLICATIONS

Li, Wei, and Andrew McCallum. "Pachinko allocation: DAG-structured mixture models of topic correlations." Proceedings of the 23rd international conference on Machine learning. ACM, 2006.*

Minka, Thomas, and John Lafferty. "Expectation-propagation for the generative aspect model." Proceedings of the Eighteenth conference on Uncertainty in artificial intelligence. Morgan Kaufmann Publishers Inc., 2002.*

Blei, David M., Andrew Y. Ng, and Michael I. Jordan. "Latent dirichlet allocation." the Journal of machine Learning research 3(2003): 993-1022.*

Steyvers; et al. "Probabilistic Topic Models" http://psiexp.ss.uci.edu/research/papers/SteyversGriffithsLSABookForamtted.pdf Published Jul. 23, 2007.

Rosen, et al. "The Author-Topic Model for Authors and Documents" http://cocosci.berkeley.edu/tom/papers/author1.pdf Published 2004.

Abramowitz, et al. "Handbook of Mathematical Functions with Formulas, Graphs and Amthematical Tables" http://www.convertit.com/global/reference/AMS55/AMS55_Sample.pdf Published Jun. 1964.

Bishop, Christopher M. "Pattern Recognition and Machine Learning" http://www/cs/princeton.edu/courses/archive/spr07/cos424/papers/bishop-regression.pdf 2006.

Blei, et al. "A Correlated Topic Model of Science" https://www.cs.princeton.edu/~blei/papers/Bleilafferty2007.pdf Mar. 2007.

Blei, et al. "Topic Models" http://www.cs.princeton.edu/~blei/papers/BleiLafferty2009.pdf Retrieved Sep. 27, 2010.

Blei, et al. "Latent Dirichlet Allocation" http://www.cs.princeton.edu/~blei/papers/BleiNgJordan2003.pdf Published Jan. 2003.

Chang, et al. "Reading Tea Leaves: How Humans Interpret Topic Models" http://www.cs.ubc.ca/~rjoty/Webpage/nips2009-rtl.pdf 2009.

Griffiths, et al. "Finding Scientific Topics" http://psiexp.ss.uci.edu/research/papers/sciencetopics.pdf Apr. 6, 2004.

Hofmann, Thomas. "Probabilistic :Latent Semantic Indexing" http://www.cs.brown.edu/~th/papers/Hofmann-SIGIR99.pdf 1999.

Kschischang, et al. "Factor Graphs and the Sum-Product Algorithm" http://www.comm.utoronto.ca/~frank/papers/KFL01.pdf Feb. 2001.

Mackay, David J.C. "Choice of Basis for Laplace Approximation" http://www.springerlink.com/content/t75546321v4330m0/fulltext.pdf May 20, 1998.

Mackay, et al. "A Hierarchical Dirichlet Language Model" http://citeseerx.ist.psu.edu/viewdoc/download?doi+10.1.1.50.1464&rep+rep1&type+pdf 1994.

Mimno, et al. "Topic Models Conditioned on Arbitrary Features with Dirichlet-multinominal Regression" http://www.cs.umass.edu/~mimno/papers/dmr-uai.pdf Retrieved Sep. 27, 2010.

Murray, et al. "Elliptical Slice Sampling" http://jmlr.csail.mit.edu/proceedings/papers/v9/murray10a/murray10a.pdf Dec. 31, 2009.

Salton, et al. "Introduction to Modern Information Retrieval" http://?lyle.smu.edu/~mhd/8337sp07/salton.pdf 1983.

Teh, et al. "Hierarchical Dirichlet Processes" http://www.cs.berkeley.edu/~jordan/papers/hierarchical-dp.pdf Nov. 15, 2005.

Teh, et al. "A Collapsed Variational Bayesian Inference Algorithm for Latent Dirichlet Allocation" http://www/gatsby.ucl.ac.uk/~ywteh/research/inference/nips2006.pdf Retrieved Sep. 27, 2010.

Zhu, et al. "Conditional Topic Random Fields" http://www.icml2010.org/papers/420.pdf Retrieved Sep. 27, 2010.

Deerwester, et al. "Indexing by Latent Semantic Analysis" http://www.cs.bham.ac.uk/~pxt/IDA/lsa_ind.pdf Sep. 1990.

\* cited by examiner

TOPIC MODELS

BACKGROUND

Much of today's information is created and shared in an electronic format. In one example, a user may upload and share a photo through a photo sharing website. In another example, users may share articles, music, web pages, and/or ideas through social networking and/or microblogging services. Unfortunately, computing devices may lack the human intellect that may be useful to understand human generated content, such as semantic meaning. Accordingly, topic models, inference algorithms, and/or other machine learning techniques have been developed to provide a mechanism for computing devices to "learn" how to understand human generated content. For example, topic models may be used to discover topic structure (e.g. content focusing on cars, sports, a specific natural disaster, political debate, etc.) and determine probabilities that documents (e.g., a text document, an online text-based article, a blog, etc.) may relate to particular topics. However, current inference algorithms for topic models may require multiple passes over a document corpus of documents, thus making such algorithms ill-suited for large scale document repositories, such as web content, which may also change rapidly. Additionally, inference algorithms that consider merely the words contained in an article in their analysis may be unable to extract meaningful topics from large corpora of short and/or semantically diverse documents. Since many online document corpora also comprise a considerable amount of additional metadata, such as the identity of the author(s), time stamps, etc., such information may be helpful in determining the topic structure of a corpus.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for training a topic model based upon sequentially processing documents and/or their features are disclosed herein. Additionally, one or more systems and/or techniques for using a topic model to predict probabilities that words, features, documents, and/or document corpora are indicative of particular topics are disclosed herein. A document corpus may comprise a structure or grouping of a wide variety of documents (e.g., social network data, blog data, feed data, a database of photos, a website of articles, textual web page data, a web service of microblogs, a file folder of spreadsheets and/or text documents, XML files, instant messages, HTML files, source code, and/or other documents or combinations thereof). Documents within the document corpus may be processed using a topic model in order to train the topic model. The trained topic model may be used by computing devices to understand and/or predict topics of documents. During processing, features of documents may be taken into account in order to enhance the processing of documents. In particular, document features may provide helpful semantic information that may not be taken into account by standard topic models.

Accordingly, as provided herein, a topic model may be trained by processing documents and document features. Document features, for example, may comprise information regarding the author, the geographical location of the author, creation date or time, document length, social network membership of author, document metadata, web browsing history of the author, source of the document, type of document, previous search queries of the author, and/or a wide variety of other features. In one example of training a topic model, respective documents within a document corpus may be processed using the topic model. In particular, for respective documents, a document representation of a document and features of the document may be received. The document representation may comprise a frequency of word occurrences within the document, for example.

The document representation and the features may be processed using the topic model. In particular, during processing, feature/topic parameters may be specified for respective features of the document. A feature/topic parameter may specify a distribution of probabilities of a feature being indicative of one or more topics, which may be used to determine potential topics of a document associated with the feature. For example a feature/topic parameters may comprise a distribution of probabilities that a feature author="Dan" may be indicative of topics, such as Video Games, Cars, Vacations. Thus, the feature/topic parameter may be used to determine potential topics of documents authored by Dan.

It may be appreciated that the topic model may comprise current feature/topic parameters based upon previously processed documents and features. During subsequent processing of documents, current feature/topic parameters may be updated with specified feature/topic parameters during training of the topic model. Because current feature/topic parameters may be adjusted during training, an uncertainty measure may be associated with probabilities of a current feature/topic parameter (e.g., an uncertainty measure may comprise uncertainty values for respective probabilities within a distribution of probabilities of the feature/topic parameter). Thus, when a feature/topic parameter is specified during processing, a first uncertainty measure associated with a current feature/topic parameter within the topic model may be taken into account. In one example, a feature/topic parameter may be specified based upon a current feature/topic parameter within the topic model, the first uncertainty measure, and/or other considerations.

Additionally, during processing, document/word/topic parameters may be specified for respective words within the document. A document/word/topic parameter may specify a distribution of probabilities of a word being indicative of one or more topics, which may be used to determine potential topics of a document comprising the word. For example, a document/word/topic parameter may comprise a distribution of probabilities that a word "bike" may be indicative of topics, such as Sports, Consumer Goods, Health, Money, House, etc. Thus, document/word/topic parameters may be used to determine potential topics of documents comprising the word "bike"

The topic model may be trained based upon the specified feature/topic parameters and the specified document/word/topic parameters. For example, current feature/topic parameters and/or current document/word/topic parameters within the topic model may be updated with the specified feature/topic parameters and/or specified document/word/topic parameters. Additionally, the first uncertainty measure and/or second uncertainty measure may be updated.

It may be appreciated that in one example, a document corpus may be processed in a single iteration. Sequentially processing documents of a document corpus in a single iteration may mitigate processing time and/or computational costs, which may facilitate the processing of larger dynamic document corpora.

In one example, a topic may comprise a grouping of words that may be descriptive of the topic. In another example, a topic may be represented by a descriptive name of the topic. It may be appreciated that descriptive names of topics are used herein merely for the sake of illustrative purposes.

It may be appreciated that the topic model may be used to determine topic predictions for words, documents, features, document corpora, etc. In one example, a document may be processed by a topic model to determine a distribution of probabilities of the document being indicative of one or more topics (a document/topic distribution prediction). In another example, a feature may be processed by the topic model to determine a distribution of probabilities of the feature being indicative of one or more topics (a feature/topic distribution prediction). In another example, a word may be processed to determine a distribution of probabilities of the word being indicative of one or more topics (a word/topic distribution prediction). In another example, a document corpus may be processed to determine a distribution of probabilities of the document corpus being indicative of one or more topics (a corpus/topic distribution prediction). Such predictions may be used to predict topics of documents, authors of documents, groupings of similar documents, etc.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
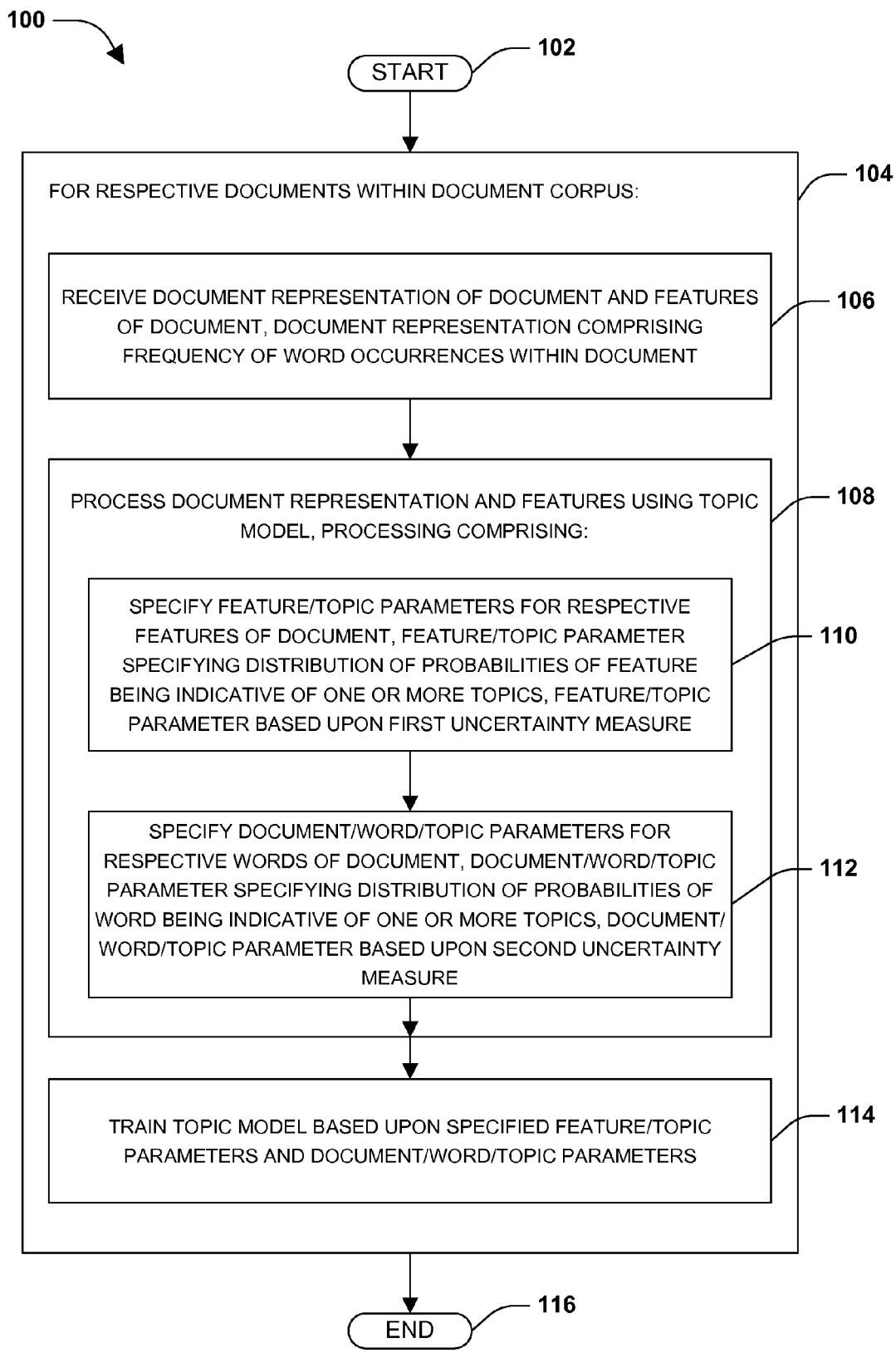
FIG. 1 is a flow chart illustrating an exemplary method of training a topic model.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Today, users generate, share, and interact with a wide variety of electronic documents, such as images, text files, web content, spreadsheets, music, etc. Unfortunately, computing devices may not comprise the human intellect to understand such documents. Accordingly, machine learning techniques have been developed in an attempt to train computing devices to understand a variety of documents, such as their semantic meaning. For example, topic models may be used as a mean of describing semantic similarities between documents in a low-dimensional latent space based upon similarity of word frequencies. That is, a topic model may provide probabilistic descriptions of documents as "bags of words", which may be generated from a mixture of discrete distributions. A document corpus may comprise a plurality of documents, where a document may concern a mixture of topics, such that respective words in the document may have been generated/motivated by a particular topic (e.g., there may be a 40% probability that the word "bike" was used within a document because the document relates to the topic of Sports).

Unfortunately, contemporary inference algorithms for topic models use multiple iterations over a document corpus. Thus, such inference algorithms/topic models may be ill-suited for large scale document corpora, such as web content (e.g., a social networking website with millions of (dynamic) messages a day). Additionally, some document corpora may comprise a large number of short documents (e.g., a status update message of a social networking website), which may be ambiguous when analyzed using merely the words of the documents.

Accordingly, as provided herein, features, such as document metadata and author information, may be analyzed when processing documents using a topic model. For example, an online repository of documents may provide document features other than the words of the documents, which may provide helpful semantic information that may not otherwise be part of a standard topic model. Using such features may facilitate the extraction of meaningful topics from small documents that would otherwise be ambiguous because of their small word count. Using one or more of the methods and/or systems described herein, computation costs maybe linear because a document corpus may be processed in a single iteration, where respective documents processing times are a linear function of the number of topics, documents and features. Linear computational costs allow for processing of larger document corpora, such as web based content. Moreover, because of sequential document processing, exponential forgetting techniques may be used to adjust for topic drifting. That is, words and/or features that are indicative of a topic may change (drift) over time. For example, the topic Oil Spill may initially have a high association with the words "wildlife", "Florida", "blame", "cleanup", etc. However, as time progresses, the topic Oil Spill may instead have a high association with the words "Texas", "litigation", "total cleanup cost", etc. Thus, as documents are processed, topic drift may be taken into account when specifying parameters within a topic model.

In one example, a topic may comprise a grouping of words that may be descriptive of the topic. In another example, a topic may be represented by a descriptive name of the topic.

It may be appreciated that descriptive names of topics are used herein merely for the sake of illustrative purposes.

One embodiment of training a topic model is illustrated by an exemplary method 100 in FIG. 1. At 102, the method starts. At 104, for respective documents within a document corpus, a document representation of a document and features of the document may be received at 106. It may be appreciated that the document corpus may comprise a plurality of documents of varying types (e.g., a repository of billions of web page articles, microbloggs, HTML documents, XML documents, text documents, social networking data, etc.). A document representation, for example, may comprise a frequency of word occurrences within the document (e.g., a vector comprising words occurring in the document and respective frequencies of occurrence of the words). A feature, for example, may comprise an author designation (e.g., a user ID, a cookie, creator metadata tag, a textual name, etc.), a geographical location (e.g., creation location of document, location of author, etc.), creation date and/or time designation, document length, social network membership of the author, web browsing history of the author, previous search queries of the author, document length, document type (e.g., spreadsheet, image, textual document, HTML, web page article, source code, XML file, search results, blogs, microblogs, social network data, instant message, etc.), source of the document (e.g., a personal computer, a mobile device, a website server, a web page, a web service, a database, etc.), identity of users having accessed (read) the document, and/or other features of documents. It may be appreciated that several features of a document may be present for a single document. Hence, the document may be described by a combination of the above. For example, a document may be generated by several authors from different geographical regions, marked as having been edited at several time points, and/or read by a number of people who are members of certain groups.

At 108, the document representation and/or the features of the document may be processed using the topic model. In a topic model, a forward action and/or a backward action may be iterated. The forward action may involve estimating the probability that the document belongs to respective topics using a generalized linear model in the document features, and for respective words in the document, estimating the probability that respective words belong to a particular topic which may be characterized by a distribution of words. In light of the actual words present in the document, the parameters used during one or more forward actions may be adjusted using Bayesian inference during a backward action, for example.

In particular, feature/topic parameters may be specified for respective features of the document, at 110. In one example, a feature/topic parameter may specify a distribution of probabilities of a feature being indicative of one or more topics. A combination of features present in the document may be used to construct a distribution of probabilities for the feature combination to be indicative of one or more topics. For example, a feature/topic parameter for a geographical location feature of Florida may comprise parameters describing probabilities that a document associated with the geographical location feature of Florida may relate to particular topics, and a feature/topic parameter for an author feature of "Dan" may comprise other parameters describing probabilities that a document created by Dan may relate to certain topics with certain probabilities. It may be appreciated that the feature/topic parameter for Florida and the feature/topic parameter for Dan may be presented as two vectors of parameters, which may be used to create a document/topic distribution prediction, for example. In particular, the two vectors of parameters for the geographical location and the author may be summed together, and a deterministic function may be used to construct probabilities for a document created in Florida by Dan to contain certain topics with certain probabilities and a certain uncertainty on those predicted topic distributions (e.g., the distribution may specify that the average topic distribution, such as a document/topic distribution prediction, for a document created by Dan in Florida is for 54% of the document's words to stem from the topic "Oil Spill", 28% of the words to stem from the topic "Hurricane", and 17% of the words to stem from the topic "Vacations" and a collective 1% of the words to stem from a variety of other topics. Additionally, an uncertainty measure for the distribution prediction might be determined. For example, the uncertainty measure may be very low, indicating that the particular distribution prediction is highly likely. In contrast, the uncertainty measure for the distribution prediction may be very large, indicating that the document might also have a substantially different topic distribution.).

It may be appreciated that the topic model may comprise current feature/topic parameters for features. However, during sequential processing of document representations and/or features, one or more current feature/topic parameters may be updated with specified feature/topic parameters during training of the topic model. In this way, feature/topic parameters may change (drift) between the processing of one document representation and/or feature to the next. An uncertainty measure of a current feature/topic parameter within the topic model may be taken into account when determining how much a specified feature/topic parameter may deviate from the current feature/topic parameter in the topic model. In one example, the feature/topic parameter may be based upon a first uncertainty measure (e.g., uncertainty based upon a Gaussian distribution) in order to account for scenarios where, for example, probability values and/or probability algorithms may have been used during processing of document representations and/or features. If the first uncertainty measure comprises a high degree of uncertainty, then the range of deviation (in comparison with current probabilities of a current feature/topic parameter within the topic model) for the probabilities of the feature/topic parameter may be high (e.g., a specified feature/topic parameter may comprise values that may be allowed to deviate substantially from a corresponding current feature/topic parameter within the topic model). In contrast, if the first uncertainty measure comprises a low degree of uncertainty, then the range of deviation for the probabilities of the feature/topic parameter may be low (e.g., a specified feature/topic parameter may comprise values that may be allowed to deviate slightly from a corresponding current feature/topic parameter within the topic model). In this way, current feature/topic parameters having a low confidence of accuracy may be updated during training with specified feature/topic parameters having a substantial allowed range of deviation (if warranted), whereas current feature/topic parameters having a high confidence of accuracy may be updated during training with specified feature/topic parameters having a small allowed range of deviation (if warranted).

Additionally during processing, document/word/topic parameters for respective words within the document may be specified, at 112. In one example, a document/word/topic parameter may specify a distribution of probabilities of a word being indicative of one or more topics. For example, a document/word/topic parameter for the word "bike" in a specific document may comprise probabilities that, in this document, the word "bike" may relate to particular topics (e.g., the distribution may specify a 40% probability that the word "bike" used in this document may have a topic of Sports, a 20% probability that the word "bike" used in this document may have a topic of Consumer Product, a 15% probability that the word "bike" used in this document may have a topic of Health, etc.).

It may be appreciated that the topic model may comprise current document/word/topic parameters for words. However, during sequential processing of document representations and/or features, one or more current document/word/topic parameters may be updated with specified document/word/topic parameters during training of the topic model. In this way, document/word/topic parameters may change between the processing of one document representation and/or feature to the next. An uncertainty measure of a current document/word/topic parameter within the topic model may be taken into account when determining how much a specified document/word/topic parameter may deviate from the current document/word/topic parameter in the topic model. In one example, the document/word/topic parameter may be based upon a second uncertainty measure (e.g., uncertainty based upon a Dirichlet distribution) in order to account for scenarios where, for example, probability values and/or probability algorithms may have been used during processing of document representations and/or features. If the second uncertainty measure comprises a high value (e.g., 90% uncertainty), then the range of deviation (in comparison with current probabilities of a current document/word/topic parameter within the topic model) for the probabilities of the document/word/topic parameter may be high (e.g., a specified document/word/topic parameter may comprise values that deviate substantially from a corresponding current document/word/topic parameter within the topic model). In contrast, if the second uncertainty measure comprises a low degree of uncertainty, then the range of deviation for the probabilities of the document/word/topic parameter may be low (e.g., a specified document/word/topic parameter may comprise values that may be allowed to deviated slightly from a corresponding current document/word/topic parameter within the topic model). In this way, current document/word/topic parameters having a low confidence of accuracy may be updated during training with specified document/word/topic parameters having a substantial allowed range of deviation (if warranted), whereas current document/word/topic parameters having a high confidence of accuracy may be updated during training with specified document/word/topic parameters having a small allowed range of deviation (if warranted).

At 114, the topic model may be trained based upon the specified feature/topic parameters and/or the specified document/word/topic parameters. For example, current feature/topic parameters and/or current document/word/topic parameters within the topic model may be updated with corresponding specified feature/topic parameters and/or specified document/word/topic parameters. It may be appreciated that the topic model may comprise other parameters that may be used during the processing of document data and/or during the training of the topic model. It may be appreciated that the processing of the document corpus may be performed within a single iteration, thus facilitating the processing of large and/or dynamic document corpora due to a linear computational cost.

It may be appreciated that the document corpus may be a dynamic repository of documents (e.g., a social network comprising frequently updated social network messages). Thus, an addition of a new document to the document corpus may be detected. A new document representation of the new document and new features of the new document may be processed using the topic model. In this way, the topic model may be updated based upon the processing of the new document (e.g., the topic model may be trained by updating current parameters with parameters specified during the processing of the new document representation and/or the new features)

It may be appreciated that the trained topic model may be used to predict a variety of distributions relating to topics, words, feature, document corpora, groupings of similar documents, and/or other information. In one example, a word/topic distribution prediction for a word within a document may be determined based upon processing the document using the topic model. The word/topic distribution prediction may specify a distribution of probabilities of the word being indicative of one or more topics for the document (e.g., FIG. 4). For example, the inclusion of the word "bike" within an article may be indicative of a variety of topics for the article (e.g., the word/topic distribution prediction may specify a 15% probability "bike" indicates the article concerns the topic Health, a 20% probability "bike" indicates the article concerns the topic Consumer Product, etc.). It may be appreciated that in another example, a word/topic distribution prediction may be determined for a word without reference to a particular document comprising the word. That is, a word/topic distribution prediction may be determined from processing the word (as opposed to a document comprising the word) with the topic model.

In another example, a reference document representation of a reference document and/or reference features of the reference document may be received for processing. A document/topic distribution prediction of the reference document may be determined based upon processing the reference document representation and/or the reference features using the topic model. The document/topic distribution prediction may specify a distribution of probabilities of the reference document being indicative of one or more topics (e.g., FIG. 5). For example, an instant message document may concern a variety of topics in varying degrees (e.g., the document/topic distribution prediction may specify an average prediction specifying that 42% of the words of that instant message concern the topic Cars, that 13% of the words of that instant message concerns the topic Racing, etc.).

The distribution of probabilities of the document/topic distribution prediction of the processed reference document may be compared to a distribution of probabilities of a document/topic distribution prediction of an input document (e.g., a document different than the reference document). In this way, a probability that the input document may comprise similar topics as the processed referenced document may be specified.

In another example, a feature/topic distribution prediction for a feature combination may be determined based upon the individual features corresponding to individual feature/topic parameters within the topic model. It may be appreciated that the feature/topic distribution prediction may be determined based upon other information within the topic model. For example, a document associated with the feature combination may be processed by the topic model when determining the feature/topic distribution prediction. The feature/topic distribution prediction may specify a distribution of probabilities of the features being indicative of one or more topics (e.g., FIG. 6 and FIG. 7). For example, a geographical location feature of "Florida" may be indicative of a variety of topics (e.g., the feature/topic distribution prediction may specify a weight of 3.8+/−2.9 that the feature of "Florida" indicates that an associated document may concern the topic Retirement, a weight of −0.2+/−0.02 for the feature of "Florida" indicating that the associated document may concern the topic Sports, etc., and the feature "Dan" may specify weights of 0.8+/−1.3 and +2.9+/−0.01 for these to topics in associated documents, respectively. The combination of (merely) the features "Florida" and "Dan" in one specific document would then sum to representations of 4.6+/−3.2 and 2.7+/−0.2 for the topics Retirement and Sports, respectively. Depending on the values of the representations of other remaining topics, these representations may be mapped by the algorithm to a topic distribution prediction which predicts the words of a document associated with merely the features "Dan" and "Florida" to, on average, stem to 63% from the topic Retirement and to 21% stem from the topic Sports (and to smaller extend from other topics). The algorithm may also return uncertainties on this average prediction of topic distributions).

In another example, a corpus/topic distribution prediction for the document corpus may be determined based upon the topic model. The corpus/topic distribution prediction may specify a distribution of probabilities of the document corpus being indicative of one or more topics (e.g., FIG. 8). In one example, the distribution of probabilities of the corpus/topic distribution prediction may be compared with a distribution of probabilities of a document/topic distribution of an input document to determine whether the input document concerns similar topics as the document corpus. In another example, one or more documents within the document corpus having semantically similar topics may be grouped as determined by the topic model. At 116, the method ends.

It may be appreciated that in one example, a document/topic distribution prediction for a document may comprise probabilities for respective words of the document to stem from a plurality of topics. Although document/topic distribution predictions may be illustrated as average predictions, it may be appreciated that document/topic distribution predictions and/or other predictions may be expressed in different manners as well, such as probabilities over probabilities.

It may be appreciated that in one example, a topic model may represent a probability distribution over probabilities. That is, a document/topic distribution prediction for a document may comprise finite probability mass assigned to respective finite sized range of probabilities of possible combinations of topics, such that the overall assigned probability mass integrates to 1. For example, a document/topic distribution prediction for a document may comprise a first distribution [(30+/−1)% Hurricane, (55+/−1)% Vacation, (10+/−1)% Cars, etc.], which may be assigned a 0.3% probability. The document/topic distribution prediction may comprise a second distribution [(5+/−3)% Oil Spill, (55+/−2)% Disney World, (3+/−1)% Cars, etc.], which may be assigned a 5% probability. In this way, a document/topic distribution prediction for a document may comprise one or more distributions of topic probabilities, where a distribution of topic probabilities may be assigned a probability.

It may be appreciated that in one example, a topic model may be associated with one or more variables. In one example of a variable, variable pi_d may comprise a distribution of a document over a plurality of topics. That is, what faction of a document's words (e.g., a percentage value) may stem from respective topics. For example, probabilities may be assigned to respective values with which pi_d may take (a probabilities prediction for pi_d), as opposed to comprising explicit values. In another example of a variable, variable c_di (e.g., a document/word/topic parameter) of a word may comprise a distribution of probabilities that respective topics may correspond to a word. Respective words within a document may be assigned a c_di. In another example of a variable, a variable theta_k (e.g., a feature/topic parameter) may comprise a distribution probability for respective topics over words within a vocabulary. For example, a topic model may specify a probabilistic statement about the values of respective theta_ks.

Figure 2:
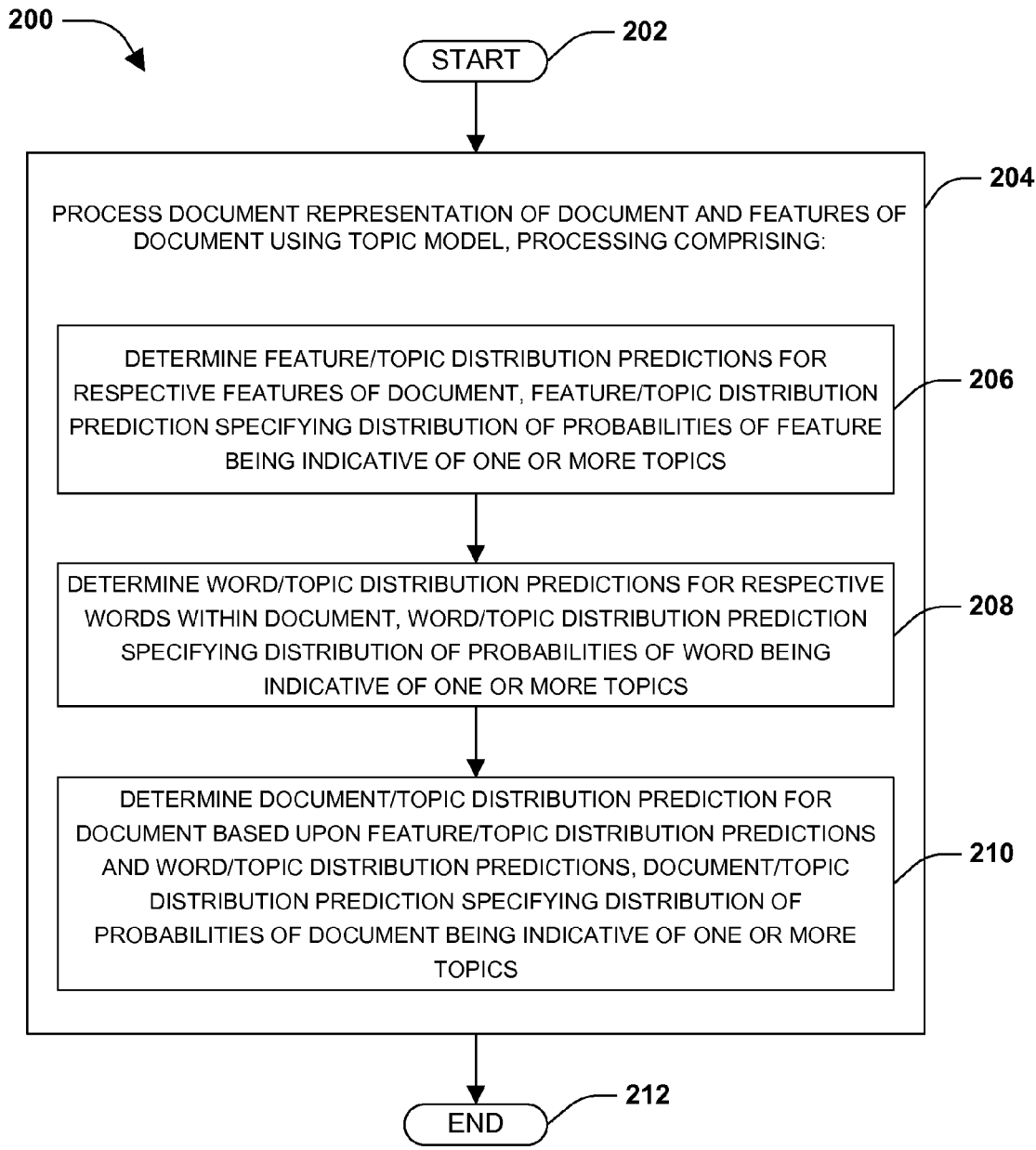
FIG. 2 is a flow chart illustrating an exemplary method of predicting topics of a document.

One embodiment of predicting topics of a document is illustrated by an exemplary method 200 in FIG. 2. At 202, the method starts. At 204, a document representation of a document and features of the document may be processed using a topic model. In particular, feature/topic distributions for respective features of the document may be determined, at 206. A feature/topic distribution may specify a distribution of probabilities of a feature combination being indicative of one or more topics. At 208, word/topic distribution predictions for respective words within the document may be determined. A word/topic distribution prediction may specify a distribution of probabilities of a word being indicative of one or more topics. At 210, a document/topic distribution prediction for the document may be determined based upon the feature/topic distribution predictions and/or the word/topic distribution predictions. The document/topic distribution prediction may specify a distribution or probabilities of the document being indicative of one or more topics. In this way, an enhanced understanding of the document may be achieved.

Figure 3:
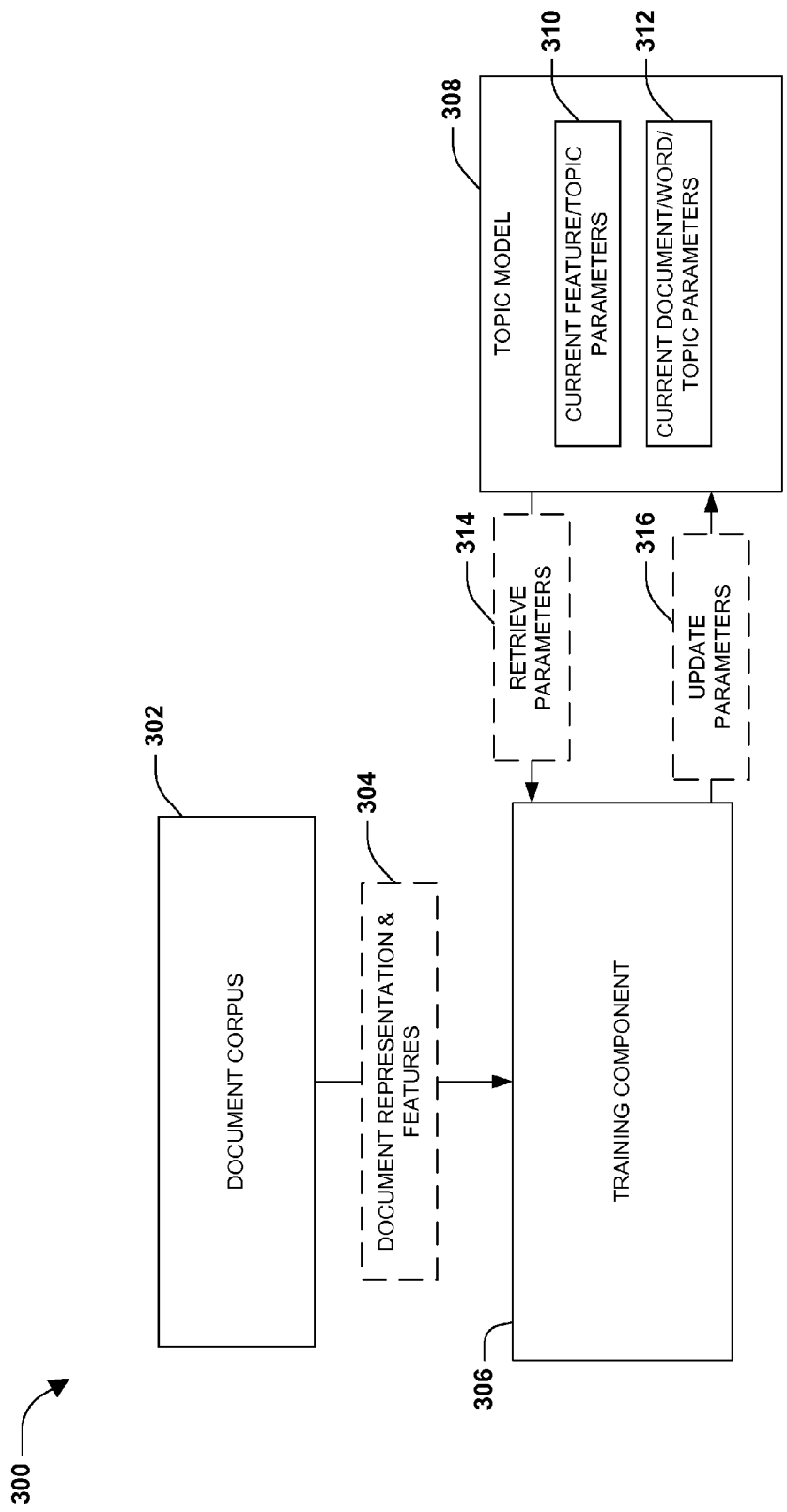
FIG. 3 is a component block diagram illustrating an exemplary system for training a topic model.

FIG. 3 illustrates an example of a system 300 configured for training a topic model 308. The system 300 may comprise a training component 306 configured to train the topic model 308 by processing documents of a document corpus 302 using the topic model 308. In particular, the training component 306 may be configured to receive a document representation of a document and features of the document (e.g., document representation & features 304). The document representation may comprise a frequency of word occurrences within the document.

The training component 306 may process the document representation and/or the features using the topic model 308. In particular, the training component 306 may retrieve (e.g., retrieve parameters 314 from the topic model 308) current feature/topic parameters 310, current document/word/topic parameters 312, a first uncertainty measure, a second uncertainty measure, and/or other processing information. In one example, the training component 306 may specify feature/topic parameters for respective features of the document. For example, the training component 306 may take into account the current feature/topic parameters 310, the first uncertainty measure, and/or other information within the topic model 308. A specified feature/topic parameter may specify a distribution of probabilities of a feature being indicative of one or more topics. Additionally, the training component 306 may specify document/word/topic parameters for respective words within the document. For example, the training component 306 may take into account the current (e.g., historical) document/word/topic parameters 312, the second uncertainty measure, and/or other information within the topic model 308.

The training component 306 may be configured to train the topic model 308 based upon the specified feature/topic parameters and/or the specified document/word/topic parameters. For example, the training component 306 may update 316 the current feature/topic parameters 310 and/or the current document/word/topic parameters 312 within the topic model 308 with corresponding specified feature/topic parameters and/or specified document/word/topic parameters. Additionally, the first and/or second uncertainty measures may be updated.

In one example, the training component 306 may be configured to group one or more documents within the document corpus 302 having semantically similar topics as determined by the topic model 308.

Figure 4:
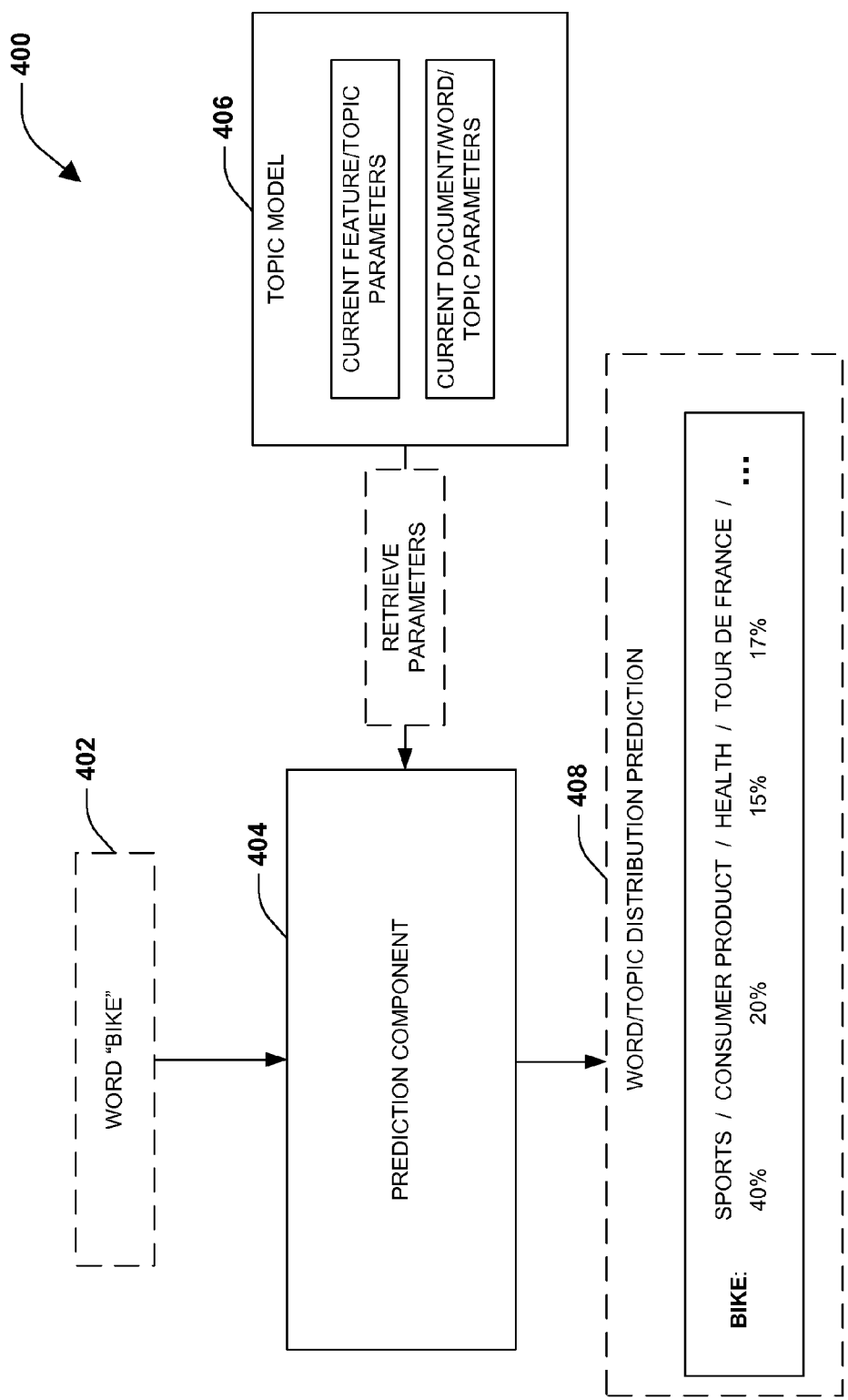
FIG. 4 is an illustration of an example of a prediction component configured to determine a word/topic distribution prediction of a word.

FIG. 4 illustrates an example 400 of a prediction component 404 configured to determine a word/topic distribution prediction 408 of a word. In one example, the prediction component 404 may be configured to determine the word/topic distribution prediction 408 based upon processing a document comprising a word "Bike" 402 using a topic model 406. In another example, such as example 400, the prediction component 404 may determine the word/topic distribution prediction 408 based upon processing the word "Bike" 402 (as opposed to processing a document comprising the word "Bike" 402) using the topic model 406. The word/topic distribution prediction 410 may specify a distribution of probabilities of a word being indicative of one or more topics for a document comprising the word.

In one example, the prediction component 404 may receive the word "Bike" 402. The prediction component 404 may retrieve parameters (e.g., a current document/word/topic parameter corresponding to "Bike") from the topic model 406. In this way, the prediction component 404 may determine the word/topic distribution prediction 408, where the word/topic distribution prediction 408 specifies a distribution of probabilities that the word "Bike" 402 is indicative of one or more topics, such as 40% indicative of Sports, 20% indicative of Consumer Products, 15% indicative of Health, 17% indicative of Tour De France, etc. Thus, the appearance of the word "Bike" 402 within a document may signify that the word "Bike" contributes a 40% indication that the document may relate to the topic Sports, for example. It may be appreciated that probabilities may be represented through a variety of techniques (e.g., percentages, floating numbers normalized so that probabilities add up to 1, etc.).

Figure 5:
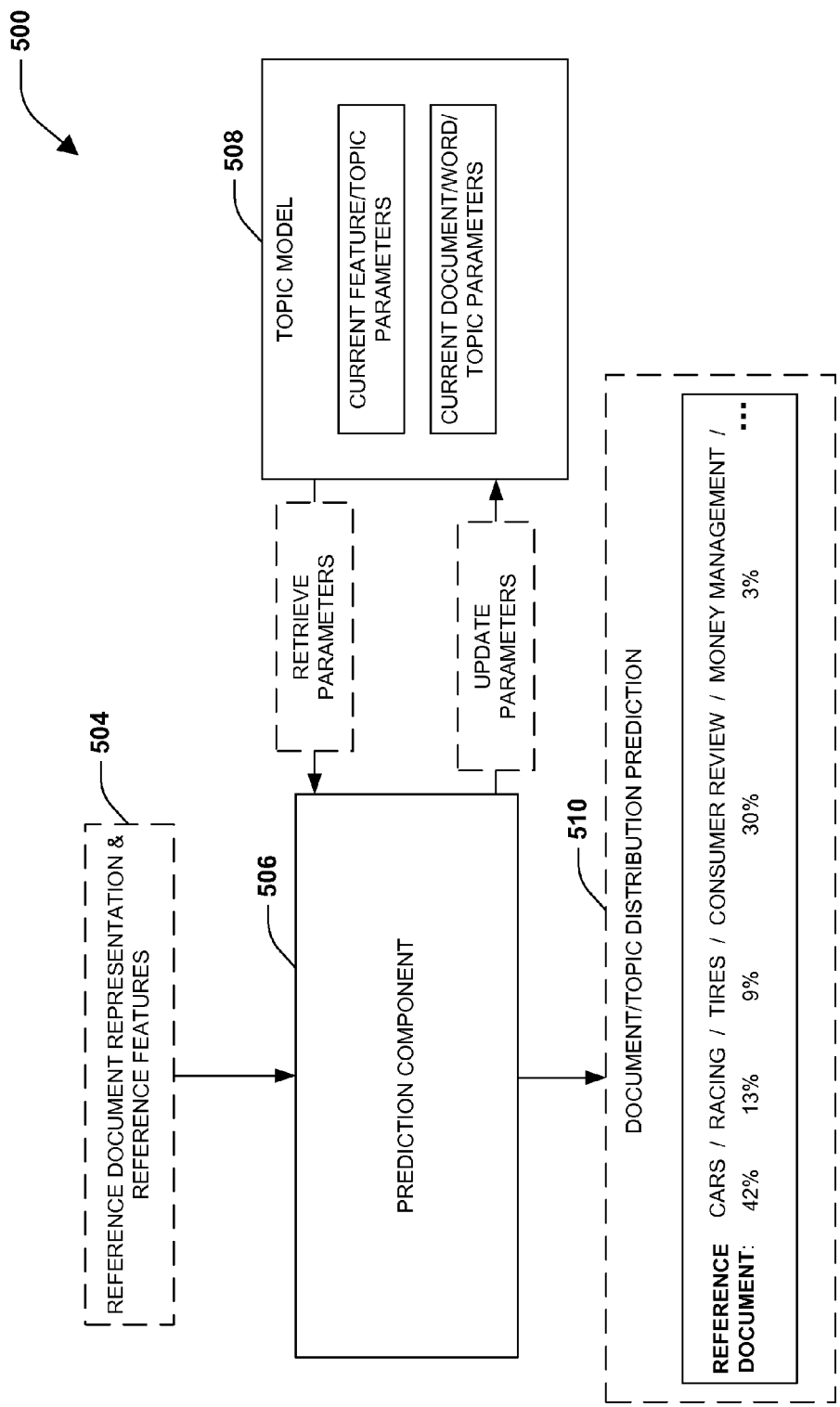
FIG. 5 is an illustration of an example of a prediction component configured to determine a document/topic distribution prediction of a reference document.

FIG. 5 illustrates an example 500 of a prediction component 506 configured to determine a document/topic distribution prediction 510 of a reference document. In one example, the prediction component 506 may receive a reference document representation of the reference document and reference features of the reference document (e.g., reference document representation & reference features 504). The prediction component 506 may determine the document/topic distribution prediction for the reference document based upon processing the reference document representation and/or the reference features using the topic model 508. For example, the processing may comprise specifying feature/topic parameters and/or document/word/topic parameters using the topic model 508. The document/topic distribution prediction 510 may specify a distribution of probabilities of the reference document being indicative of one or more topics (e.g., the prediction may specify a distribution over a topic distribution, such that the average topic distribution in this document are 42% for the topic Cars, 13% for the topic Racing, and 9% for the topic Tires, etc.). In this way, an enhanced understanding of the reference document may be achieved. For example, the prediction component 506 may be configured to determine a document/author distribution prediction for the referenced document based upon processing the reference document representation & reference features 504. The document/author distribution prediction may specify a distribution of probabilities that one or more authors created the reference document.

In another example, the prediction component 506 may be configured to group one or more documents having semantically similar topics as determined by the topic model 508 (e.g., documents associated with similar document/topic distributions).

Figure 6:
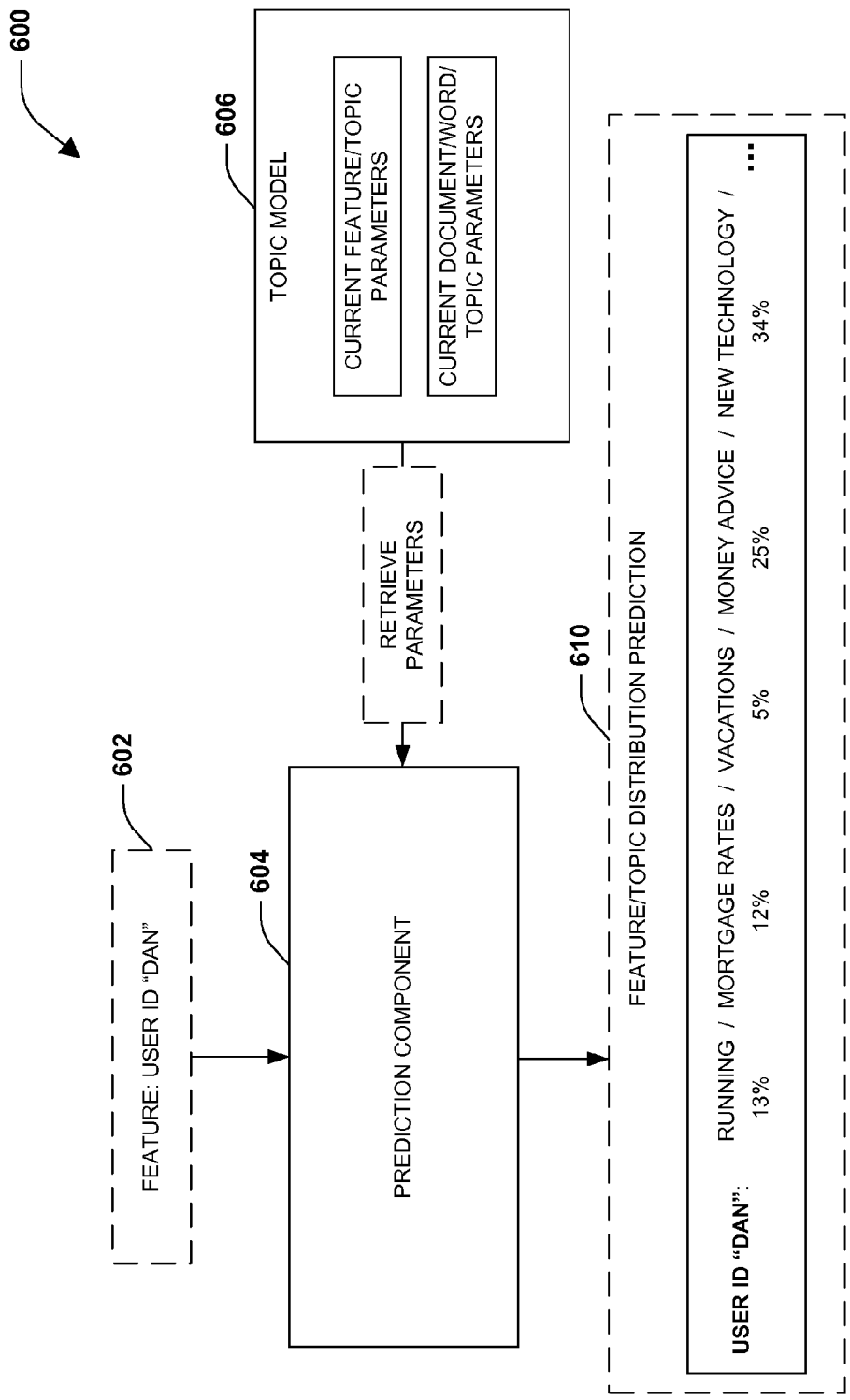
FIG. 6 is an illustration of an example of a prediction component configured to determine a feature/topic distribution prediction of a feature.

FIG. 6 illustrates an example 600 of a prediction component 604 configured to determine a feature/topic distribution prediction 610 of a feature. In one example, the prediction component 604 may determine the feature/topic distribution prediction 610 for a feature User ID="Dan" 602 (e.g., a feature indicating an author of one or more documents). For example, the prediction component 604 may determine the feature/topic distribution prediction 610 based upon the feature User ID="Dan" 602 corresponding to one or more current feature/topic parameters within the topic model 606. That is, the topic model 606 may have been previously trained by processing one or more documents associated with the feature User ID="Dan" 602. It may be appreciated that respective training documents may have been associated with other features besides the feature User ID="Dan". Thus, the topic model 606 may comprise one or more current feature/topic parameters for the feature User ID="Dan" 602 (e.g., various documents authored by Dan may have been processed to determine topics that Dan may have a probability to write about in documents). In this way, the topic model 606 may be used to determine the feature/topic distribution prediction 610. The feature/topic distribution prediction 610 may specify a distribution of probabilities of the feature User ID="Dan" 602 being indicative of one or more topics (e.g., there may be a 13% probability that a document authored by Dan may concern the topic Running, a 12% probability that a document authored by Dan may concern the topic Mortgage Rates, etc., and this prediction may be associated with an uncertainty measure). In this way, an enhanced understanding of how the feature User ID="Dan" may be indicative of topics for documents authored by Dan may be achieved.

Figure 7:
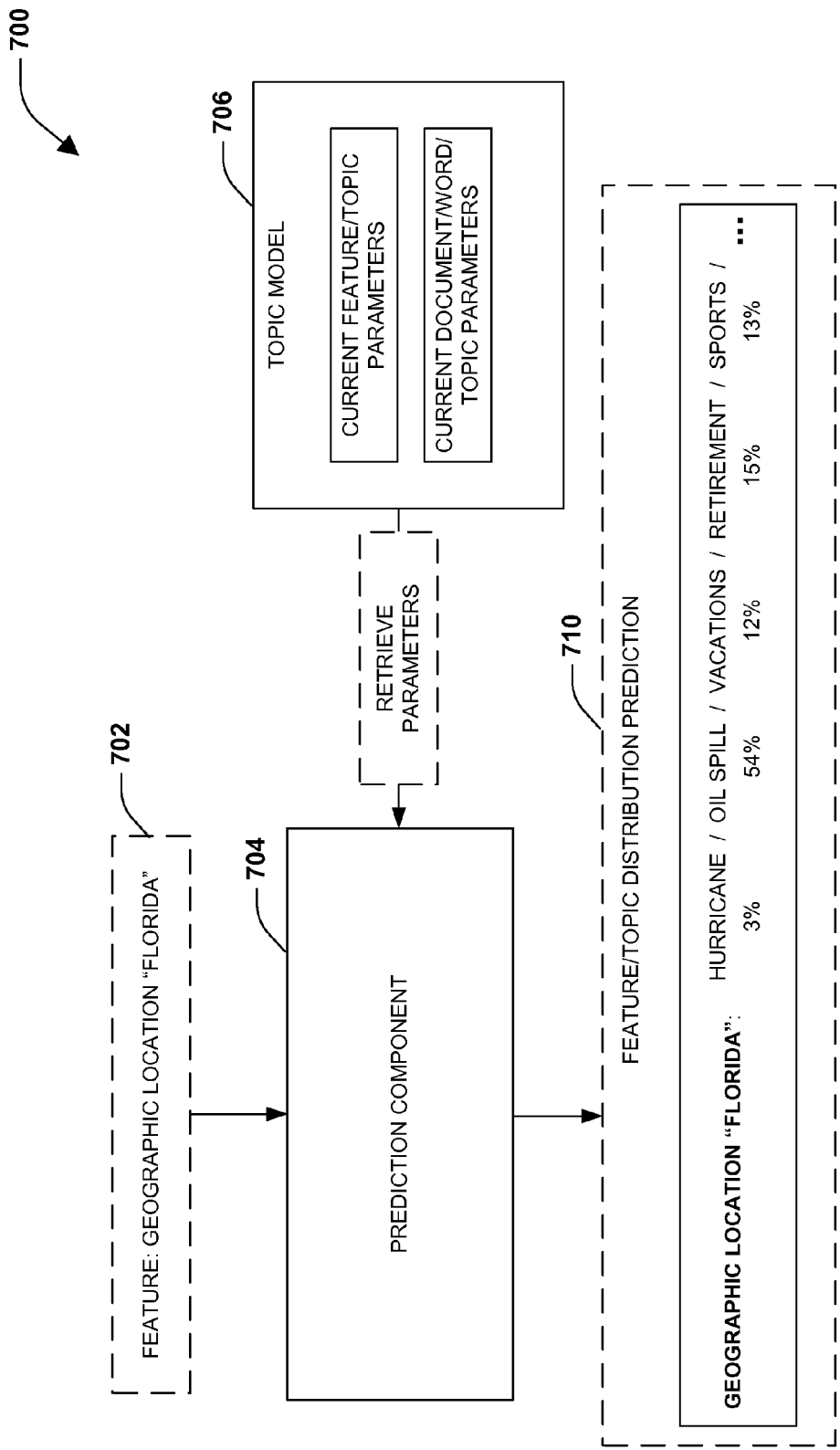
FIG. 7 is an illustration of an example of a prediction component configured to determine a feature/topic distribution prediction of a feature.

FIG. 7 illustrates an example 700 of a prediction component 704 configured to determine a feature/topic distribution prediction 710 of a feature. In one example, the prediction component 704 may determine the feature/topic distribution prediction 710 for a feature Geographical Location="Florida" 702 (e.g., a feature indicating a location where a document was created). For example, the prediction component 704 may determine the feature/topic distribution prediction 710 based upon the feature Geographical Location="Florida" 702 corresponding to one or more current feature/topic parameters within the topic model 706. That is, the topic model 706 may have been previously trained by processing one or more documents associated with the feature Geographical Location="Florida" 702. Thus, the topic model 706 may comprise one or more current feature/topic parameters for the feature Geographical Location="Florida" 702 (e.g., various documents authored in Florida may have been processed to determine topics that documents authored in Florida may concern). In this way, the topic model 706 may be used to determine the feature/topic distribution prediction 710. The feature/topic distribution prediction 710 may specify a distribution of probabilities of the feature Geographical Location="Florida" 702 being indicative of one or more topics (e.g., the prediction may be that the average distribution of documents authored in Florida is for 3% of the words of such documents to stem from the topic Hurricane, 54% of the words of such documents to stem from the topic Oil Spill, etc., and this average prediction may be associated with an uncertainty measures). In this way, an enhanced understanding of how the feature Geographical Location="Florida" may be indicative of topics for documents authored in Florida be achieved.

Figure 8:
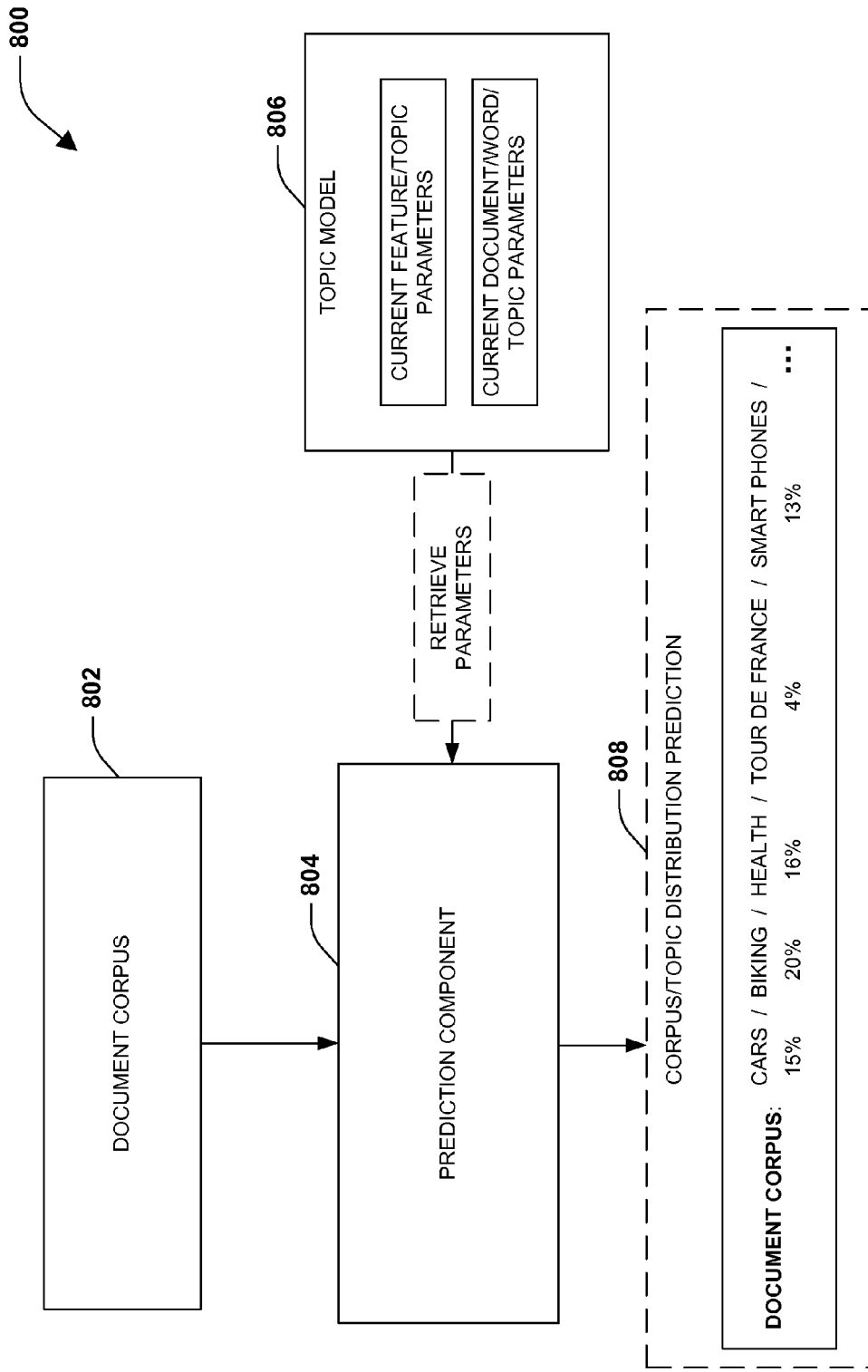
FIG. 8 is an illustration of an example of a prediction component configured to determine a corpus/topic distribution prediction of a document corpus.

FIG. 8 illustrates an example 800 of a prediction component 804 configured to determine a corpus/topic distribution prediction 808 of a document corpus 802. In one example, the prediction component 804 may sequentially process documents (e.g., document representations of documents and/or features of such documents) in order to train a topic model 806. Thus, the topic model 806 may comprise current feature/ topic parameters and/or current document/word/topic parameters corresponding to features and/or words of documents within the document corpus. In this way, the prediction component 804 may determine the corpus distribution prediction 808 based upon such parameters and/or other information within the topic model 806. The corpus/topic distribution prediction 808 may specify a distribution of probabilities of the document corpus 802 being indicative of one or more topics (e.g., the prediction may be that the average document in the corpus consists to 15% of words from the topic of Cars, to 20% of words from the topic of Biking, etc., and this average prediction may be associated with an uncertainty measure). In this way, an enhanced understanding of document corpus 802 and/or the documents comprised therein may be achieved.

Figure 9:
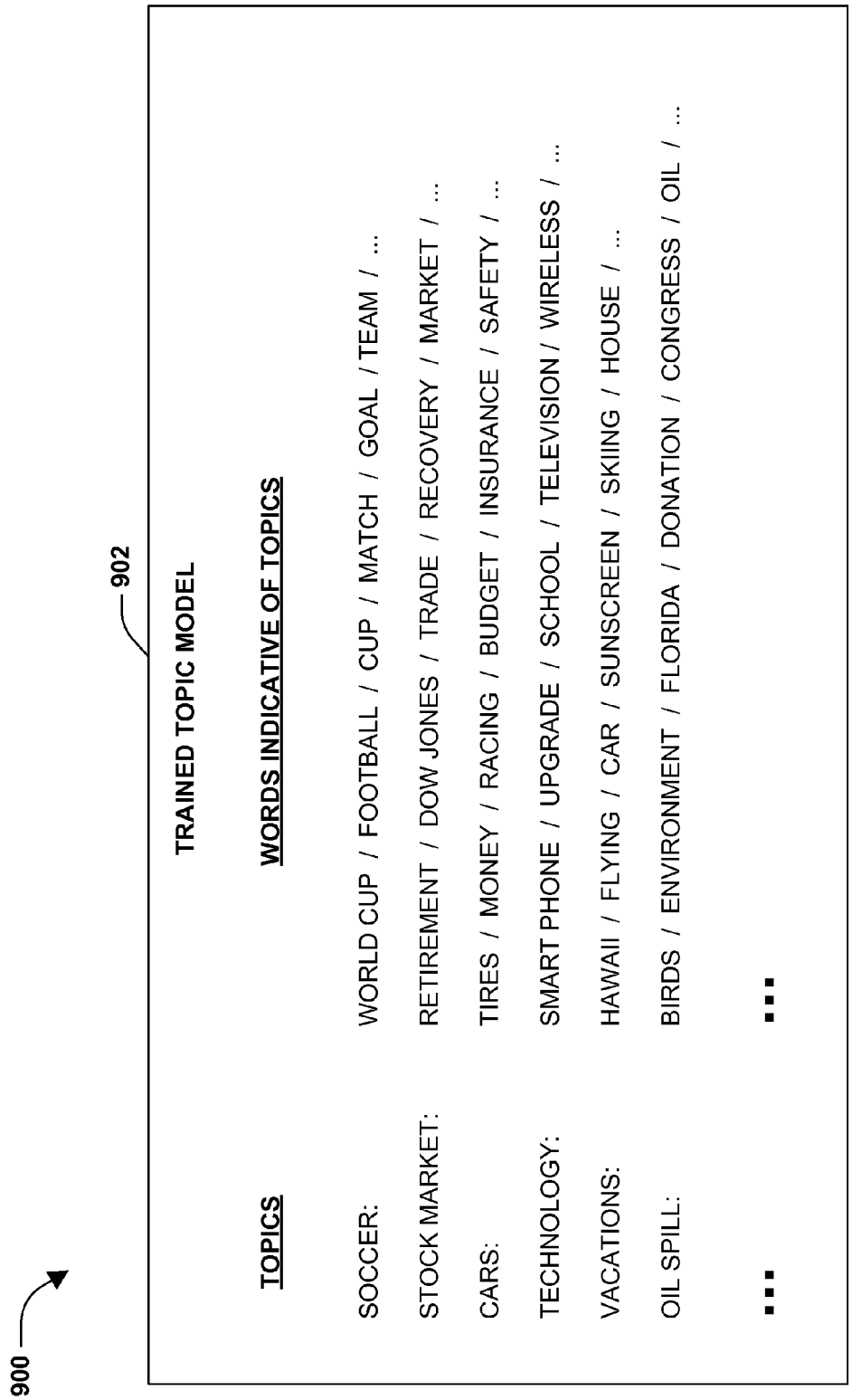
FIG. 9 is an illustration of an example of a trained topic model.

FIG. 9 illustrates an example 900 of a trained topic model 902. The trained topic model 902 may comprise a plurality of topics (e.g., a few hundred topics). Respective topics within the trained topic model 902 may be associated with a plurality of words (e.g., a vocabulary of ten thousand words), where a word may comprise a probability of the word showing up in a document concerning a specific topic. In one example, the topic Soccer may be associated with a plurality of words (e.g., "world cup", "football", "cup", "wireless", "house", "goal", "pig", and/or thousands of words). The word "world cup" may comprise a probability of 0.2% of showing up when selecting words from the topic Soccer, whereas the word "pig" may comprise a probability of 0.0002% of showing up when selecting words from the topic Soccer. In this way, the trained topic model 902 may be used to predict topics of words, features, documents, document corpora, etc.

Figure 10:
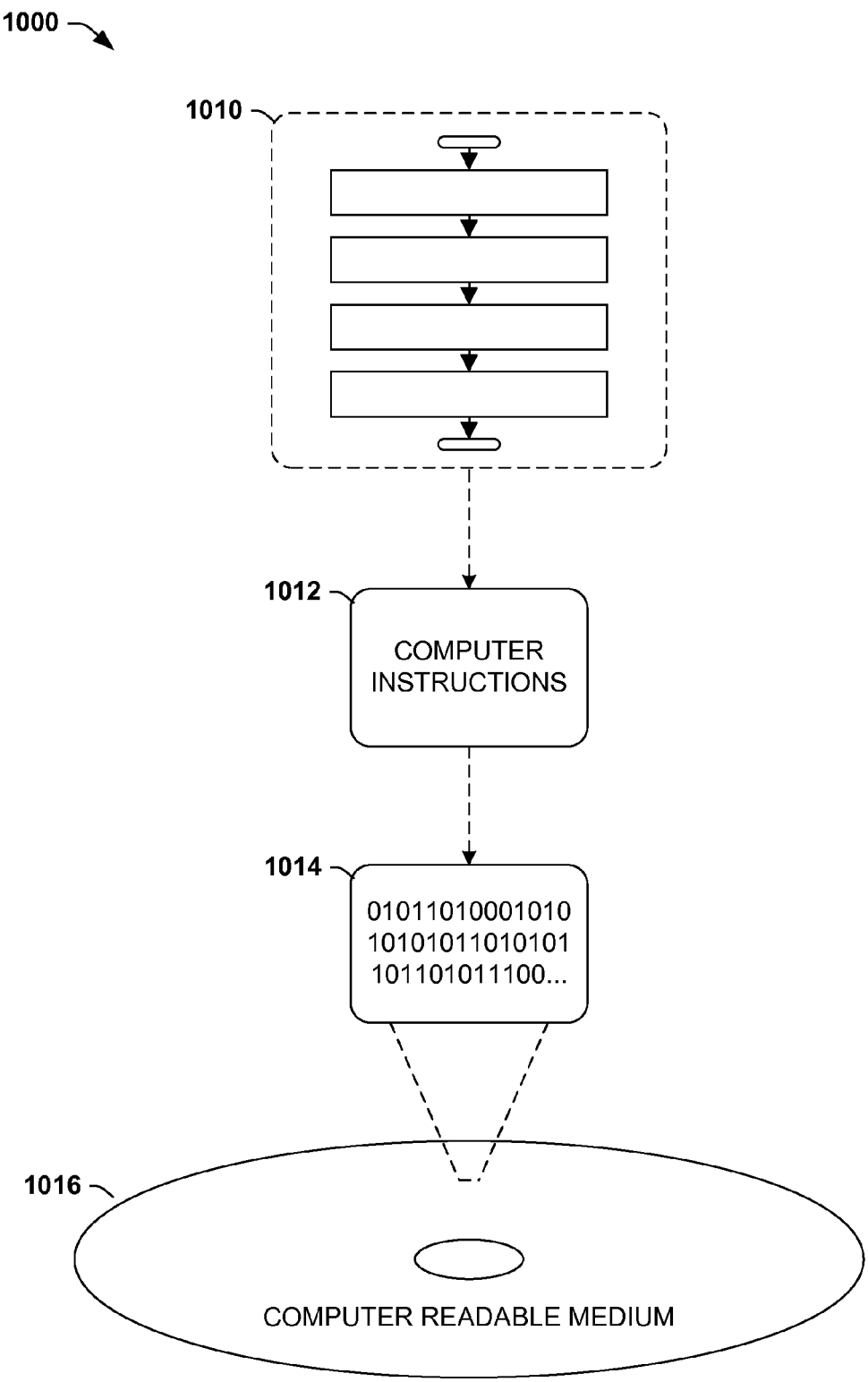
FIG. 10 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 10, wherein the implementation 1000 comprises a computer-readable medium 1016 (e.g., a CD-R, DVD-R, or a platter of a hard disk drive), on which is encoded computer-readable data 1014. This computer-readable data 1014 in turn comprises a set of computer instructions 1012 configured to operate according to one or more of the principles set forth herein. In one such embodiment 1000, the processor-executable computer instructions 1012 may be configured to perform a method 1010, such as at least some of the exemplary method 100 of FIG. 1 and/or exemplary method 200 of FIG. 2, for example. In another such embodiment, the processor-executable instructions 1012 may be configured to implement a system, such as at least some of the exemplary system 300 of FIG. 3, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 11:
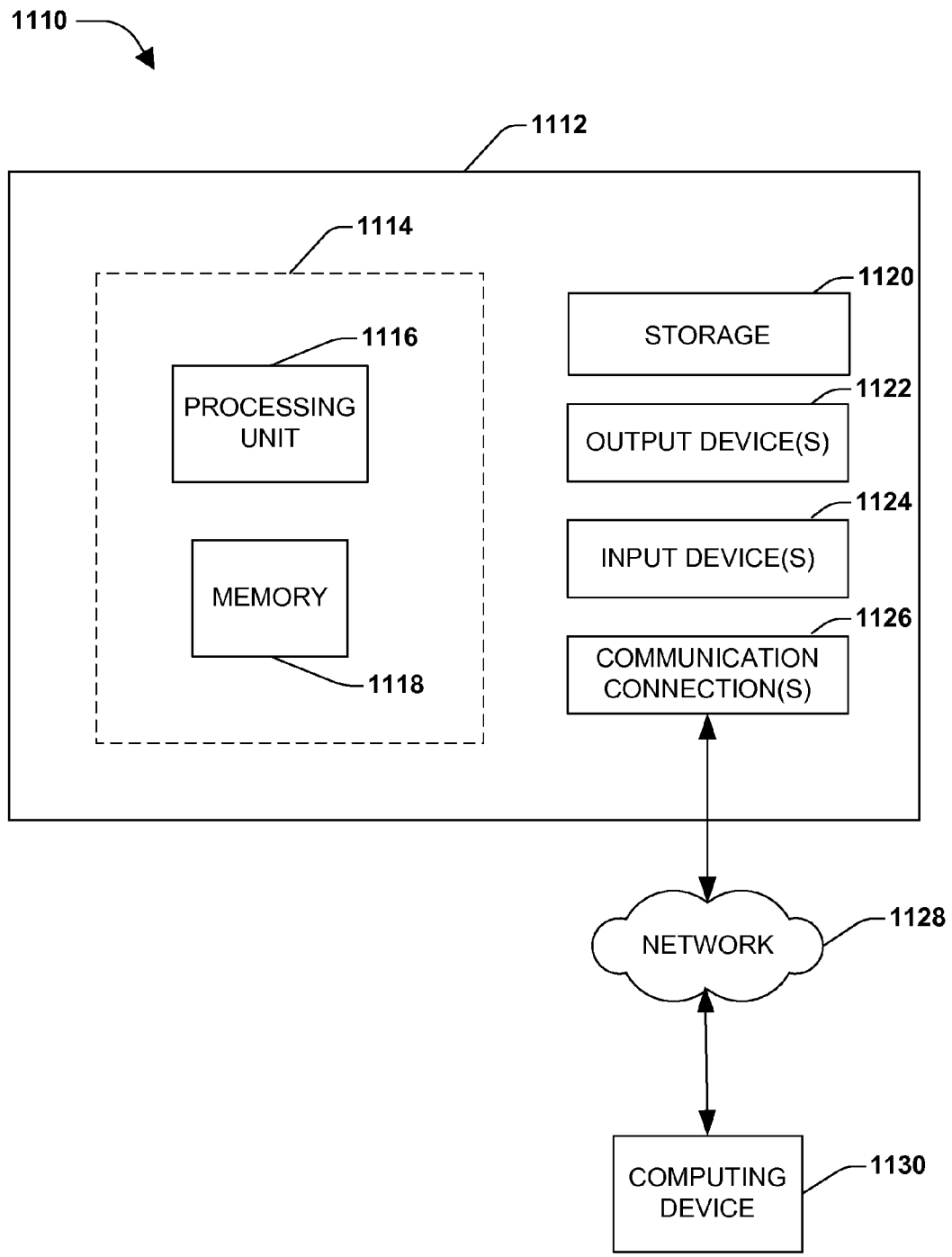
FIG. 11 illustrates an exemplary computing environment wherein one or more of the provisions set forth herein may be implemented.

FIG. 11 and the following discussion provide a brief, general description of a suitable computing environment to implement embodiments of one or more of the provisions set forth herein. The operating environment of FIG. 11 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 11 illustrates an example of a system 1110 comprising a computing device 1112 configured to implement one or more embodiments provided herein. In one configuration, computing device 1112 includes at least one processing unit 1116 and memory 1118. Depending on the exact configuration and type of computing device, memory 1118 may be volatile (such as RAM, for example), non-volatile (such as ROM, flash memory, etc., for example) or some combination of the two. This configuration is illustrated in FIG. 11 by dashed line 1114.

In other embodiments, device 1112 may include additional features and/or functionality. For example, device 1112 may also include additional storage (e.g., removable and/or non-removable) including, but not limited to, magnetic storage, optical storage, and the like. Such additional storage is illustrated in FIG. 11 by storage 1120. In one embodiment, computer readable instructions to implement one or more embodiments provided herein may be in storage 1120. Storage 1120 may also store other computer readable instructions to implement an operating system, an application program, and the like. Computer readable instructions may be loaded in memory 1118 for execution by processing unit 1116, for example.

The term "computer readable media" as used herein includes computer storage media. Computer storage media includes volatile and nonvolatile, removable and non-removable media implemented in any method or technology for storage of information such as computer readable instructions or other data. Memory 1118 and storage 1120 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1112. Any such computer storage media may be part of device 1112.

Device 1112 may also include communication connection(s) 1126 that allows device 1112 to communicate with other devices. Communication connection(s) 1126 may include, but is not limited to, a modem, a Network Interface Card (NIC), an integrated network interface, a radio frequency transmitter/receiver, an infrared port, a USB connection, or other interfaces for connecting computing device 1112 to other computing devices. Communication connection(s) 1126 may include a wired connection or a wireless connection. Communication connection(s) 1126 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1112 may include input device(s) 1124 such as keyboard, mouse, pen, voice input device, touch input device, infrared cameras, video input devices, and/or any other input device. Output device(s) 1122 such as one or more displays, speakers, printers, and/or any other output device may also be included in device 1112. Input device(s) 1124 and output device(s) 1122 may be connected to device 1112 via a wired connection, wireless connection, or any combination thereof. In one embodiment, an input device or an output device from another computing device may be used as input device(s) 1124 or output device(s) 1122 for computing device 1112.

Components of computing device 1112 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1112 may be interconnected by a network. For example, memory 1118 may be comprised of multiple physical memory units located in different physical locations interconnected by a network.

Those skilled in the art will realize that storage devices utilized to store computer readable instructions may be distributed across a network. For example, a computing device 1130 accessible via a network 1128 may store computer readable instructions to implement one or more embodiments provided herein. Computing device 1112 may access computing device 1130 and download a part or all of the computer readable instructions for execution. Alternatively, computing device 1112 may download pieces of the computer readable instructions, as needed, or some instructions may be executed at computing device 1112 and some at computing device 1130.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for training a topic model, comprising:
    for a document within a document corpus:
        receiving a document representation of the document and features of the document, the document representation comprising a frequency of word occurrences within the document;
        processing the document representation and the features using a topic model, the processing comprising:
            specifying a feature/topic parameter for a feature of the document, the feature/topic parameter specifying a probability of the feature being indicative of a first topic, the feature/topic parameter based upon a first uncertainty measure that is associated with a first determination of a first deviation of the feature/topic parameter from a current feature/topic parameter for the topic model;

updating the first uncertainty measure based upon a first difference measure between the feature/topic parameter and one or more previously specified feature/topic parameters for the topic model, the first difference measure representing a first range of deviation for the first uncertainty measure;

specifying a document/word/topic parameter for a word within the document, the document/word/topic parameter specifying a probability of the word being indicative of a second topic, the document/word/topic parameter based upon a second uncertainty measure that is associated with a second determination of a second deviation of the document/word/topic parameter from a current document/word/topic parameter for the topic model; and updating the second uncertainty measure based upon a second difference measure between the document/word/topic parameter and one or more previously specified document/word/topic parameters for the topic model, the second difference measure representing a second range of deviation for the second uncertainty measure; and training the topic model based upon the feature/topic parameter and the document/word/topic parameter.

2. The method of claim 1, comprising:
determining a word/topic distribution prediction for a second word within a second document based upon processing the second document using the topic model, the word/topic distribution prediction specifying a probability of the second word being indicative of a third topic.

3. The method of claim 1, comprising:
receiving a reference document representation of a reference document and reference features of the reference document; and
determining a document/topic distribution prediction for the reference document based upon processing the reference document representation and the reference features using the topic model, the document/topic distribution prediction specifying a probability of a second word within the reference document stemming from a third topic.

4. The method of claim 3, comprising:
specifying an input document as comprising similar topics as the reference document.

5. The method of claim 1, comprising:
determining a feature/topic distribution prediction for a second feature based upon the second feature corresponding to one or more feature/topic parameters within the topic model.

6. The method of claim 1, comprising:
determining a corpus/topic distribution prediction for the document corpus based upon the topic model, the corpus/topic distribution prediction specifying a probability of the document corpus being indicative of a third topic.

7. The method of claim 6, comprising:
specifying an input document as comprising similar topics as the document corpus.

8. The method of claim 1, comprising:
processing the document corpus within a single iteration.

9. The method of claim 1, comprising:
detecting a new document added to the document corpus; and
processing a new document representation of the new document and new features of the new document using the topic model.

10. The method of claim 9, comprising updating the topic model based upon the processing of the new document representation and the new features.

11. The method of claim 1, comprising:
grouping one or more documents within the document corpus having semantically similar topics as determined by the topic model.

12. The method of claim 1, the features of the document comprising at least one of:
author designation;
reader designation;
geographical location;
creation date designation;
creation time designation;
document length;
document metadata;
source of the document;
document type;
social network membership of author;
web browsing history of author; or
previous search queries of author.

13. A system for training a topic model, comprising:
one or more processing units; and
memory comprising instructions that when executed by at least one of the one or more processing units, perform a method comprising:
for a document within a document corpus:
receiving a document representation of the document and features of the document, the document representation comprising a frequency of word occurrences within the document;
processing the document representation and the features using a topic model, the processing comprising:
specifying a feature/topic parameter for a feature of the document, the feature/topic parameter specifying a probability of the feature being indicative of a first topic, the feature/topic parameter based upon a first uncertainty measure that is associated with a first determination of a first deviation of the feature/topic parameter from a current feature/topic parameter for the topic model;
updating the first uncertainty measure based upon a first difference measure between the feature/topic parameter and one or more previously specified feature/topic parameters for the topic model, the first difference measure representing a first range of deviation for the first uncertainty measure;
specifying a document/word/topic parameter for a word within the document, the document/word/topic parameter specifying a probability of the word being indicative of a second topic, the document/word/topic parameter based upon a second uncertainty measure that is associated with a second determination of a second deviation of the document/word/topic parameter from a current document/word/topic parameter for the topic model; and
updating the second uncertainty measure based upon a second difference measure between the document/word/topic parameter and one or more previously specified document/word/topic parameters for the topic model, the second difference measure representing a second range of deviation for the second uncertainty measure; and training the topic model based upon the feature/topic parameter and the document/word/topic parameter.

14. The system of claim 13, the features of the document comprising at least one of author designation or reader designation.

15. The system of claim 13, the features of the document comprising geographical location.

16. The system of claim 13, the features of the document comprising at least one of creation date designation or creation time designation.

17. The system of claim 13, the features of the document comprising at least one of document metadata or source of the document.

18. The system of claim 13, the features of the document comprising at least one of document length or document type.

19. The system of claim 13, the features of the document comprising at least one of social network membership or web browsing history.

20. A computer readable device comprising instructions that when executed by a processing unit perform a method for training a topic model, the method comprising:
for a document within a document corpus:
receiving a document representation of the document and features of the document, the document representation comprising a frequency of word occurrences within the document;
processing the document representation and the features using a topic model, the processing comprising:
specifying a feature/topic parameter for a feature of the document, the feature/topic parameter specifying a probability of the feature being indicative of a first topic, the feature/topic parameter based upon a first uncertainty measure that is associated with a first determination of a first deviation of the feature/topic parameter from a current feature/topic parameter for the topic model;
updating the first uncertainty measure based upon a first difference measure between the feature/topic parameter and one or more previously specified feature/topic parameters for the topic model, the first difference measure representing a first range of deviation for the first uncertainty measure;
specifying a document/word/topic parameter for a word within the document, the document/word/topic parameter specifying a probability of the word being indicative of a second topic, the document/word/topic parameter based upon a second uncertainty measure that is associated with a second determination of a second deviation of the document/word/topic parameter from a current document/word/topic parameter for the topic model; and
updating the second uncertainty measure based upon a second difference measure between the document/word/topic parameter and one or more previously specified document/word/topic parameters for the topic model, the second difference measure representing a second range of deviation for the second uncertainty measure; and
training the topic model based upon the feature/topic parameter and the document/word/topic parameter.

\* \* \* \* \*